Jan. 29, 1974   J. J. SHYNE ET AL   3,788,935
HIGH SHEAR-STRENGTH FIBER-REINFORCED COMPOSITE BODY
Original Filed Nov. 29, 1966

James J. Shyne
John V. Milewski
INVENTORS

BY Walter Katz
ATTORNEY

United States Patent Office 3,788,935
Patented Jan. 29, 1974

3,788,935
HIGH SHEAR-STRENGTH FIBER-REINFORCED
COMPOSITE BODY
James J. Shyne, Caldwell, and John V. Milewski, Saddle
Brook, N.J., assignors to General Technologies Corporation, Reston, Va.
Continuation of application Ser. No. 597,686, Nov. 29, 1966. This application May 27, 1970, Ser. No. 41,710
Int. Cl. B32b 15/00
U.S. Cl. 161—141
10 Claims

ABSTRACT OF THE DISCLOSURE

A high shear-strength composite is formed in a matrix material by aligning boron filaments of larger diameter, for example ten to one hundred microns, and supporting them with smaller intersititally disposed whiskers of alpha-alumina randomly distributed in the body of a diameter, for example of one to three microns, which fibers may be discontinuous.

CROSS REFERENCE TO RELATED APPLICATIONS

This is a continuation of our copending application Ser. No. 597,686 filed Nov. 29, 1966, now abandoned.

This invention relates to high-strength fiber-reinforced composites, and, more particularly, to a high shear-strength fiber-reinforced composite body.

Reinforcement of materials with high-strength fibers has been used extensively for greatly improving their strength-to-density ratios. Such reinforced bodies are referred to in the art as "fiber-reinforced composites." A typical composite comprises a matrix material in which is incorporated a plurality of reinforcement fibers which impart the desired high-strength to the resultant composite. The fibers usually are metallic, ceramic or refractory materials, of an amorphous, polycrystalline, or single crystal structure, and either short length, i.e. discontinuous, or elongated filamentary, i.e. continuous fibers. The matrix material is generally a plastic, resin, metal or ceramic. Three recent review articles give excellent and extensive summaries of the theory and experimental aspects of fiber-reinforced composites. These are:

(1) A. Kelly and G. J. Davies: Metallurgical Reviews, 10, 1–77 (1965);
(2) D. Cratchley: Metallurgical Reviews, 10, 79–144 (1965);
(3) T. Vasilos and E. G. Wolff: Journal of Metals, 18, 583–592 (1966).

The general conclusion reached in these review papers, of the present state of the art, is that fiber-reinforcement of materials is feasible and promising but that considerable research and development is necessary before the ultimate in high-strength properties of such composites can be reached.

Accordingly, it is an object of the present invention to provide an improved high-strength fiber-resin-forced composite body.

A more specific object of the invention is to provide a high shear-strength fiber-reinforced composite body.

Still another object is to provide an improved composite having a high strength-to-density ratio.

A feature of the present invention is the use of small diameter fibers interstitially positioned between large diameter fibers to increase substantially the shear-strength of the resultant composite body.

Another feature of the invention is the provision of a fiber-reinforced composite having a high shear-strength using a plurality of substantially aligned first fibers of large diameter interstitially supported by a plurality of second fibers of relatively smaller diameter randomly distributed with respect to the first fibers.

A further feature of the invention is the use of whiskers as the smaller diameter fibers.

Still another feature is the use of three-dimensionally shaped whisker material as the second fiber reinforcement to increase the interlaminar shear strength of the composite.

Among the other features of the invention is the selection and use of fibers of predetermined size and shape, and in various physical form, continuous and discontinuous, aligned, oriented and random, of a particular volume and weight concentration, to provide improved composite bodies of high strength.

These and other objects and features of the invention will be made apparent from the following more detailed description of the invention in which reference will be made to the accompanying drawings, in which.

In its general aspects, the present invention involves the use of at least two reinforcement fibers of significantly different diameters to provide a composite body having enhanced strength properties. The small diameter fibers are interstitially positioned between the large diameter fibers so that they act to bind the large diameter fibers to each other and thereby increase the shear strength of the entire body. The large diameter fibers preferably are aligned within the body so that the small diameter fibers can either be randomly distributed or oriented in their interstitial positions. In one embodiment of the invention the small diameter whiskers are a three-dimensional whisker product made according to the process described in the copending patent application Ser. No. 479,111, filed Aug. 12, 1965, now abandoned, by the same inventors as herein. A typical high shear-strength composite according to the invention includes a matrix material having aligned boron filaments of large diameter interstitially supported by smaller diameter, discontinuous whiskers of alpha-alumina randomly distributed in the body.

Figure 1:
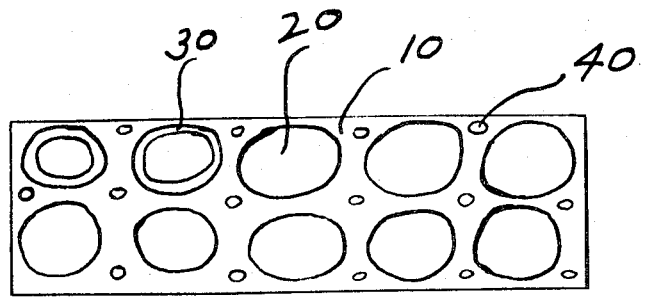
FIG. 1 is a schematic illustration of a fiber-reinforced composite body in accordance with the present invention.

Referring now to FIG. 1, there is shown a schematic illustration of a high shear-strength fiber-reinforced composite body in accordance with the present invention. The body comprises a matrix 10 which may be made of any material desired for a particular structure and application. Plactics, resins, metals, ceramics and refractories are usual matrix materials. Representative plastics and resins include epoxies, polyesters and polyamides. Typical metals include aluminum, magnesium, silver, copper, nickel, iron, titanium, cobalt and their alloys. A ceramic matrix material may be selected from the fiber materials listed below.

Within matrix 10 are a plurality of fibers 20 which form a first reinforcement network in the composite body. The fibers 20 also may be made of any reinforcement material known in the art to enhance the strength of a mattrix material. Such fibers materials are made from elements, compounds and alloys. Light weight elements, compounds, such as oxides, nitrides, borides, carbides, and silicides, and glasses, may be used. Typical fiber materials include boron, graphite, silicon, beryllium, silicon, carbide, silicon nitride, aluminum oxide, aluminum nitride, aluminum carbide, aluminum diboride, boron carbide, boron nitride, boron silicide, tungsten carbide, titanium diboride, titanium nitride, beryllium oxide, beryllium boride, and like fibers.

The fibers may be amorphous, polycrystalline, or single crystal materials, present in the form of elongated, or continuous filaments, or short-length, discontinuous fibers.

Often adhesion between the matrix 10 and fibers 20 is insufficient for good bonding. Then it is necessary to employ an intermediary or bridge material 30 between the matrix and reinforcement fibers. The intermediary material usually is applied by coating either the matrix or fiber with the coating agent 30. Coatings not only increase the adhesion between the matrix and reinforcement fibers, but they improve abrasion resistance and modulus of the composite. In addition adverse high temperature reactions often are minimized. Coatings may be formed from inorganics, organo-metallics or metals; often thin metallic coatings are used.

The fibers 20 of the composite body shown in FIG. 1 are themselves reinforced interstitially by means of a second group of smaller diameter fibers 40. These fibers 40 may consist of the same material as the larger diameter fibers 20, or be different in composition. In a preferred form of the invention, the fibers 40 are discontinuous, single crystal fibers, or whiskers, randomly distributed interstitially between and attached to the large diameter fibers 20. The whiskers serve to bind the larger diameter fibers together to increase their overall high-strength properties, particularly with respect to shear-strength characteristics. Suitably the whiskers constitute at least 0.1 volume percent of the composite, and probably a higher concentration.

The ratio of the diameters of fibers 30, to whiskers 40 should be at least 3, and preferably at least 10. The ratio even may be as high as 100. For example, fiber 20 may have a diameter of from about 10–100 microns, and the interstitial fibers 40 may have a diameter of from about 1–3 microns. These values may vary widely depending upon the nature of the particular material used and the application desired. Similarly the length of the fibers 20 and whiskers 40 may vary widely, from elongated filaments to discontinuous fibers. In one embodiment of the invention the fibers 20 are elongated filaments of boron, and the whiskers 40 are discontinuous alumina whiskers.

The composite body of the invention may be made by any technique known in the art for making fiber reinforced composite bodies. A particularly suitable method for use herein is a filament winding technique. In this method a preformed mandrel in the shape of the desired structure is provided and the elongated fibers 20 are wound over the mandrel. Then the matrix material having the whisker material incorporated therein is applied over the fibers. The fibers themselves may be coated with a coating agent before being wound on the mandrel. In this manner the fibers 20 are aligned directionally in the resultant composite while the whiskers are randomly distributed interstitially between the large diameter fibers.

Composites made according to the principles of the invention herein exhibit exceptionally high shear-strength properties as compared to similar fiber reinforced composites without interstitial reinforcement. While the theory of operation of this invention is not completely understood at present, it is believed to be based on the mechanics of bonding between the components of the composite. When a conventional composite containing discontinuous fibers in a matrix is stressed in a direction parallel to the fibers, the axial displacements in the fiber and matrix are different because of the difference in their elastic moduli. This difference means that the shear strains are produced in the matrix and all planes parallel to the axis of the fibers, in the direction of the axis. These shear strains are the mechanism by which the tensile loads supported by the fiber and matrix are distributed between the two components. Since the tensile stress/strain curve of the matrix is of a lower slope than that of the fibers, and since the displacements in the matrix and fiber must be identical, the resulting stresses developed in the fiber are much higher than those caused by the matrix. In the present composite body, interstitial reinforcement by fibers of small diameter significantly increases the ability of the large diameter fibers to withstand stresses on the composite body.

In addition, in a composite, stresses that are not exactly in line with the fibers overstress the matrix and cause failure through the matrix. In the present composite, the whiskers also reinforce the matrix by being aligned in a direction generally transverse to the matrix.

Figure 2:
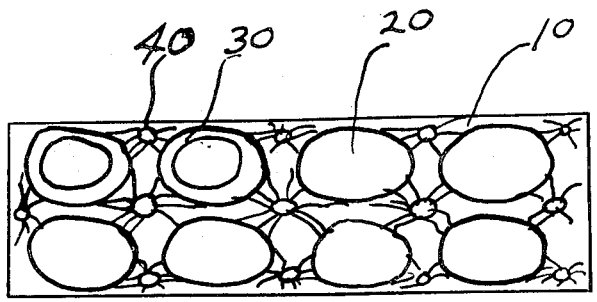
FIG. 2 shows another embodiment of the same body.

The whiskers 40 also can improve interlaminar interstitial shear-strength in the composite. As illustrated in FIG. 2, the whiskers 40 may be three-dimensional in geometrical structure. Such whiskers therefore bind the fibers 20 not only within a given layer but also between layers. Thereupon the interlaminar shear-strength of the composite is improved.

Of particular utility in providing such interlaminar, interstitial reinforcement is the use of a three-dimensional whisker product described in detail in the aforementioned copending application. This three-dimensional whisker product comprises generally a rigid, single crystal fiber having a plurality of shorter length single crystal whiskers spaced along its longitudinal axis and appended thereto in a direction generally transverse to the axis of the fiber. One such product includes a rigid metallic fiber of, for example, silicon, on which is appended short-length whiskers such as alpha-alumina, aluminum nitride and/or silicon carbide. The whisker product usually has a diameter of about 3–30 microns and a length of about 30–6000 microns, with a length-to-diameter ratio of about 10:1 to 200:1.

This three-dimensional whisker product is made by a process which is generally similar to that used in making alpha-alumina whiskers themselves. In this process a boat of refractory ceramic material is provided for a charge of aluminum pellets. The boat is usually composed of alumina and silica admixed with a small amount of other metallic oxides. Preferably a few percent of aluminum metal powder is included in the boat composition. The boat is loosely fitted with a ceramic cover which is usually made of the same material as the boat itself but without the aluminum powder. The boat and cover are made by firing the constituents at elevated temperatures, usually about 2,000°–2,500° F.

Then the run is started and carried out in three stages. First the aluminum charge is wetted into the boat by heating in a dry inert atmosphere, usually hydrogen, at an elevated temperature. Secondly, a wet hydrogen atmosphere is passed over the boat and its contents. Up to 40,000 p.p.m. of water may be added at this point, but usually only about 300 p.p.m. is used during the beginning of whisker growth. Finally, in a third stage, further amounts of water are added, usually up to 3,000 p.p.m. at the end of the growth. The flow rates and temperature also are decreased and increased incrementally respectively, during the course of the growth. Usually the flow rate decreases from 0.03 cu. ft./sec., to 0.001 cu. ft./sec., to 0.0001 cu. ft./sec., and the temperature from 2,200° F., to 2,500° F. to 3,100° F. for about an hour run.

At the end of the run, a three-dimensionally shaped dark whisker product is found in the boat in a region below a cluster-ball deposit of pure loose alpha-alumina whiskers. The product has a dark, rigid, elongated center whisker fiber of a metallic-like material, and a plurality of white whiskers, usually of alpha-alumina and aluminum nitride attached along the fibers.

The principle of the present invention may be utilized to provide composites for any specific application. One such application is that of a molding composite. Such a composite includes a plurality of discontinuous fibers or whiskers of large diameter, e.g. about 3–10 microns, and small diameter interstitially positioned whiskers, e.g. about 0.2–1.0 microns.

These molding composites have excellent flow properties and a close packing distribution. A high percentage of the interstitial fiber is possible in this composite. They can be molded readily into articles having very small cross-section, in order of 2 mils in thickness or less. In addition to the usually high-strength properties of the molding composite, in the order of 10–15 million modulus, it exhibits excellent dimensionally stability, and an ability to mold around and retain micrometallic inserts in electronic applications.

The following specific examples will more particularly illustrate the invention.

EXAMPLE I

A plurality of elongated boron filaments each having a diameter of about 100 microns, are wound on a mandrel to a desired shape. Then an epoxy resin containing discontinuous, loose alpha-alumina whiskers having a diameter of about 3 microns and a length of about 400 microns is impregnated over the boron filaments to form a composite structure. The resultant composite contains 50 volume percent of boron filaments and about 1 volume percent of alpha-alumina whiskers. The shear strength of the composite is measured in a short-beam shear tester with three-point loading. A shear strength of 14,000 p.s.i. is observed. A similarly prepared composite without alpha-alumina whiskers has a shear strength of only 8,000 p.s.i.

EXAMPLE II

The procedure of Example I is followed using fiberglass having a diameter of 10 microns in place of the boron filaments. An increase of 20% in the shear-strength is observed in such composites with composites without alpha-alumina whiskers.

EXAMPLE III

In this example, the interstitial fibers are a three-dimensional whisker product referred to earlier above. This whisker product is incorporated into the composite in the same manner as described in the above example. At a concentration of 1 volume percent, an increase in the interlaminar shear strength of the resultant composite of about two times is observed.

EXAMPLE IV

A molding composite is prepared by mixing chopped, short-length fiberglass having a diameter of about 10 microns and lengths of about 1/32 to 1/8 inches, a phenolic resin and 1½ volume percent of 1 micron diameter alpha-alumina whiskers having a length of about 400 microns. The composite is molded to a thickness of about 1 mil. The biaxial tensile strength of the composite is 17,000 p.s.i. A similarly prepared composite without the addition of the whiskers exhibits a biaxial tensile strength of only 15,000 p.s.i. Further volume additions of fiberglass to the latter composites show no measurable increase in tensile strength, whereas further additions of whiskers enhance the tensile strength of whisker-containing composites.

While the invention has been described with respect to certain embodiments thereof, changes and modifications may be made which are within the skill of the art. It is intended to be limited only by the appended claims.

What is claimed is:
1. A high-strength fiber-reinforced composite body comprising:
    (a) a matrix material
    (b) a plurality of first reinforcing fibers having a diameter of from about 10–100 microns incorporated into said matrix, and
    (c) a plurality of second reinforcing fibers having a diameter at least three times smaller than said first fibers interstitially positioned between said first fibers, said second fibers being three dimensional crystal whiskers.
2. A high-strength composite body according to claim 1 wherein said second fibers are attached to and bind said first fibers.
3. A high shear-strength composite body according to claim 1 wherein said first fibers are aligned in said matrix.
4. A high-strength composite body according to claim 1 wherein said first fibers are non-woven.
5. A high interlaminar shear-strength composite body according to claim 1 wherein said second fibers are randomly distributed between said first fibers.
6. A high-strength composite body according to claim 1 wherein the diameter of said first fibers is at least ten times the diameter of said second fibers.
7. A high-strength composite body according to claim 1 wherein said first fibers are continuous filaments.
8. A high-strength composite body according to claim 1 wherein said second fibers are present in an amount of at least 0.1 volume percent of said composite.
9. A high-strength composite body according to claim 1 wherein said first fibers are aligned, non-woven continuous filaments.
10. A high-strength composite body according to claim 1 wherein said second fibers are alpha-alumina whiskers.

References Cited

UNITED STATES PATENTS

| | | | |
|---|---|---|---|
| 3,466,219 | 9/1969 | Schwartz | 161—57 |
| 3,371,993 | 3/1968 | Norwalk | 23—201 |
| 2,428,654 | 10/1947 | Collins | 161—141 |
| 3,246,950 | 4/1966 | Gruber | 23—208 |

OTHER REFERENCES

Rosato, D. V., "Nonwoven Fibers in Reinforced Plastics," Industrial & Engineering Chemistry, vol. 54, No. 8, August 1962, pp. 31–33.

ROBERT F. BURNETT, Primary Examiner

R. O. LINKER, JR., Assistant Examiner

U.S. Cl. X.R.

161—143, 170